June 9, 1953 F. D'OZOUVILLE 2,641,637
REMOTE CONTROL DEVICE FOR MULTIPLE-SPEED GEAR BOXES
Filed March 13, 1950 4 Sheets-Sheet 1
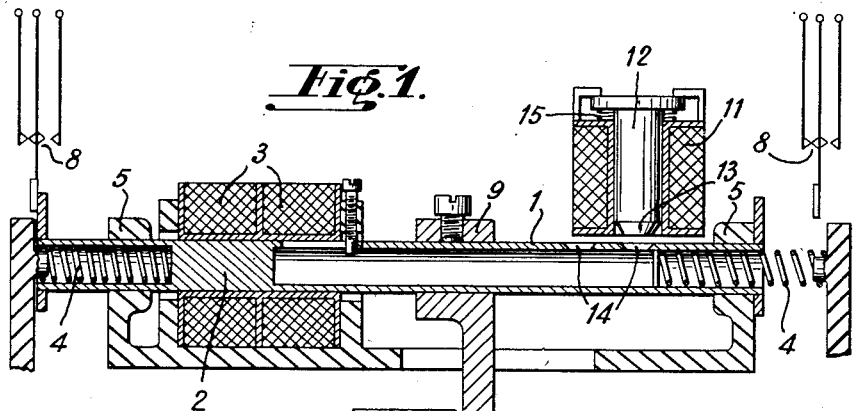
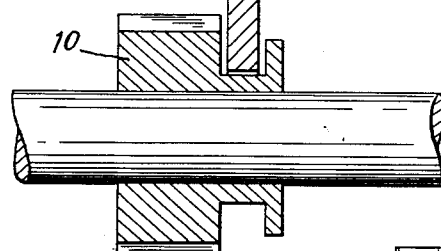
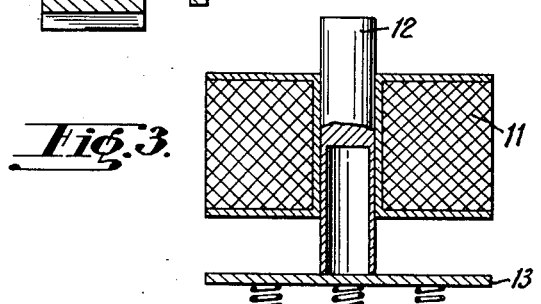
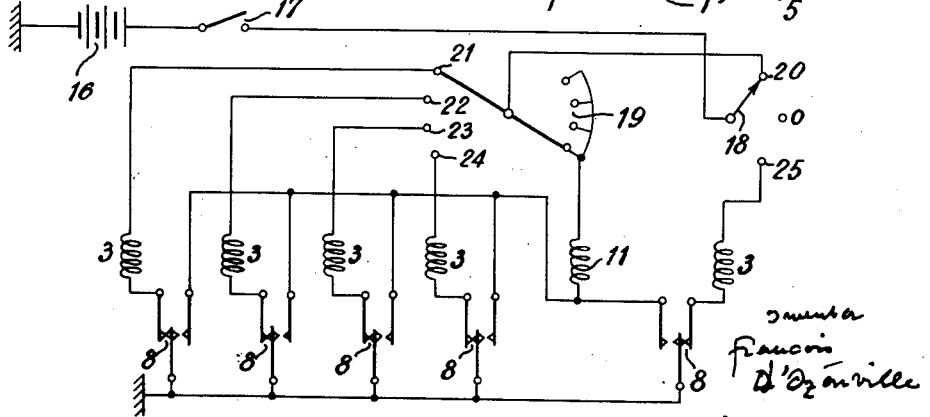

June 9, 1953  F. D'OZOUVILLE  2,641,637
REMOTE CONTROL DEVICE FOR MULTIPLE-SPEED GEAR BOXES
Filed March 13, 1950  4 Sheets-Sheet 3

Inventor
François d'Ozouville

UNITED STATES PATENT OFFICE 2,641,637

REMOTE CONTROL DEVICE FOR MULTIPLE-SPEED GEAR BOXES

François d'Ozouville, Paris, France, assignor to Siper S. A., Emsallah, Tangier, a corporation of the Tangier Zone Application March 13, 1950, Serial No. 149,364
In Switzerland March 29, 1949

11 Claims. (Cl. 175—335)

The present invention relates to a remote control device for a multiple-speed gear-box of the type comprising at least one sliding member arranged to actuate sliding gears to bring them selectively into engagement with at least one chosen gear wheel.

In the remote control device according to the invention, this sliding member is actuated by at least one electro-magnet. By energizing one of these electro-magnets, a longitudinal movement of the sliding striker rod is obtained, which is thus brought into a position corresponding to one of the chosen gear-ratios.

The sliding member, consisting of a striker rod, may be locked in working position by energizing another electro-magnet, called the locking electro-magnet, or, on the contrary, by interrupting the energizing circuit of this electro-magnet.

This control device enables omitting the usual gear-box control lever which, in the case of a motor car, obstructs the space between the two front seats.

In addition, this device enables the remote control in the cases when the gear-box mechanism is at a distance, and this without employing a complicated gear device, as is the case with certain mechanical control devices.

The accompanying drawing shows, by way of example, two embodiments of the remote control device according to the invention:

Fig. 1 is a partial sectional elevation of this embodiment.

Fig. 2 is the electro diagram of this embodiment, arranged for providing five gear-ratios, one of which is a reverse speed.

Fig. 3 is a cross section of a modified form of the electric locking mechanism.

Figure 4:
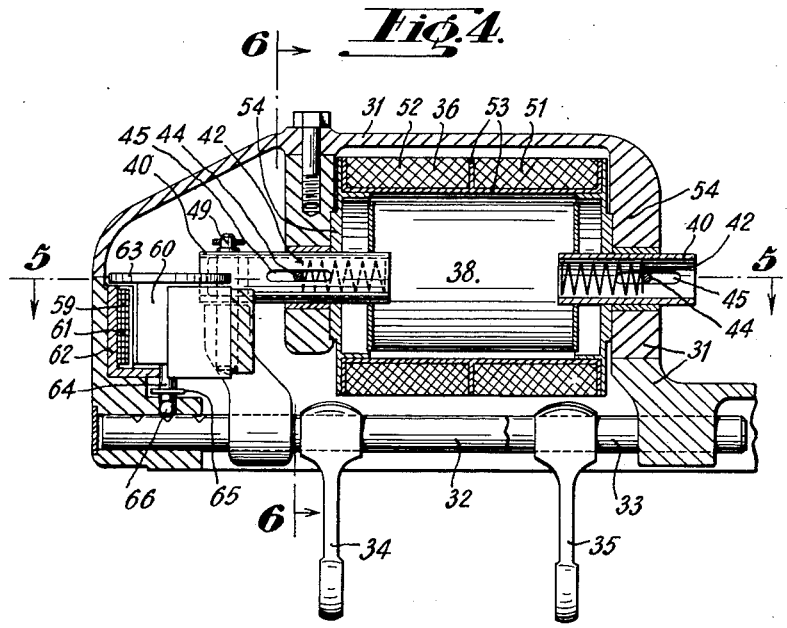
Fig. 4 is a sectional elevation, along 4—4 in Fig. 5, of the upper part of a gear-box of a motor vehicle.
Figure 5:
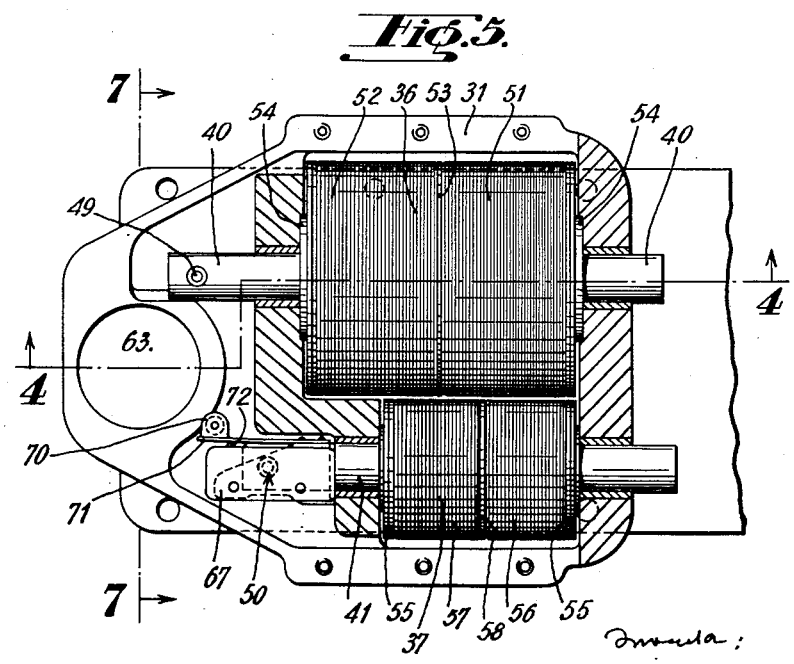
Fig. 5 is a horizontal section along 5—5 in Fig 4.
Figure 6:
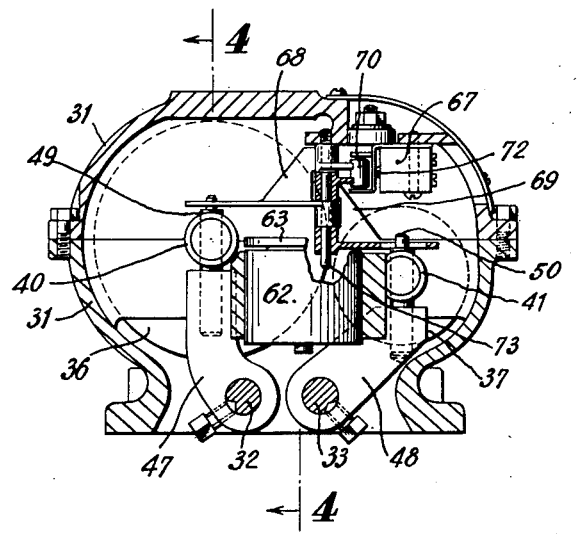
Fig. 6 is a sectional elevation along 6—6 in Fig. 4.

In Fig. 1, 1 is a sliding striker rod consisting of a tube having a variable magnetic cross section, 2 is the armature of the electro-magnet 3, 4 are springs serving to bring the striker rod back to its dead position when the electro-magnets are not energized, 5 are bosses of the casing of the gear-box forming the gear-box mechanism, in which the striker rod 1 is slideably mounted. The tubular ends of this striker rod may be provided with slots into which the ends of screws secured to the casing penetrate, so as to prevent the rod from rotating about its axis. The ends of the rod 1 carry push-pieces serving to actuate contacts 8. 9 and 10 are a striker fork and a sliding gear. 11 is an electro-magnet which has an armature 12 and serves to lock the striker rod in the chosen working position. To this end the armature 12 carries a projecting part 13, in the form of a spur, arranged to engage into notches 14 provided in the striker rod. 15 is a spring serving to draw back the armature 12 when the electro-magnet 11 is not energized through a selector arranged to send the current through one or the other of the electro-magnets 3.

In Fig. 2, 16 is a source of electric current, for instance the battery of accumulators of a motor vehicle on which the control device is mounted. The main switch 17 of this vehicle also sends current to a selector comprising the switches 18 and 19. The switch 18 has three positions: forward, contact point 20; reverse, contact point 25 and neutral, contact point O. The switch 19 has four positions 21, 22, 23 and 24 corresponding to four different forward gear-ratios. The windings 3 of the electro-magnets and 11 of the locking electro-magnet are fed through this selector 18—19 and they are connected to the mass through the change-over switch 8 in such a manner that only one of these windings 3 and 11 can be energized at a time.

The device described operates in the following manner:

To obtain a determined gear-ratio, the switches 18 and 19 are actuated so as to energize that one of the electro-magnets 3 which corresponds to this gear-ratio. The armature 2 of a striker rod moves to the corresponding working position and causes its sliding gear to mesh with the gear wheel corresponding to the desired ratio. At the end of the stroke, the contact 8 is actuated, the circuit of the electro-magnet 3 is interrupted and that of the locking electro-magnet 11 is closed. The projecting part 13 penetrates into that one of the notches 14 which corresponds to the chosen ratio and thus locks the striker rod in the position corresponding to this ratio. It is to be noted that the electro-magnet 11 is fed through the selector when the latter is no longer in its dead position.

When the selector is brought back to its dead position, the electro-magnet 11 is no longer energized and the armature 12 is pushed back by the spring 15, thus releasing the striker rod. The latter then moves under the action of the springs 4 until the forces exerted by these springs balance one another, the striker rod then being in its neutral position.

It is to be remarked that the electro-magnet 11 can be constructed so as to have a very small current consumption. On the other hand, the spring 4 enables an improved operation of an auto-synchronizing device. Indeed, its action is opposed to that of the electro-magnet 3 and, at the end of the stroke, this spring tends to slow down the movement of the armature 2 until the electro-magnet 11 cancels this braking action by thrusting the projecting part 13 of its armature 12 into one of the notches 14.

In Fig. 3, showing a modified form of the electric locking mechanism, the member 13 carried by the armature 12 of the locking electro-magnet 11 consists of a plate which simultaneously presses on three balls by means of springs and which can thus lock any one of three striker rods in one of its working positions. If desired, this electric locking mechanism may also be arranged to lock simultaneously the other striker rods in their respective dead positions: it suffices to provide each striker rod with a notch cooperating with one of the balls in the dead position of this rod. The springs may also be substituted by rigid push-pieces, formed by distance-pieces secured to the member 13.

On Figs. 4 to 7, the drawing shows the cover 31 of a gear-box of a motor vehicle. Sliding members 32 and 33, which form the striker rods of this gear-box, are mounted in the cover 31. Each of these rods bears a striker fork 34, respectively 35, designed to move the sliding gears of the second and third speeds and of the first and reverse speeds of the gear-box respectively.

Each of the rods is actuated by an electro-magnet with double winding 36, respectively 37. Each of these electro-magnets has a movable core of ferro-magnetic material 38, 39 supported inside the windings by rods 40, 41 arranged to slide in bosses forming part of the cover 31. Springs 42, are lodged inside the hollow rods 40, respectively 41 and bear against the core 38 at one end, and against pins 44 at the other. These pins are fixed in the bosses of the cover 31 and slide in longitudinal slits 45 of the rods 40, respectively 41. The springs 42 thus maintain the core 38 in a central position as long as no current is flowing in either of the windings of the associated electro-magnet. One of the rods 40, respectively 41 is connected to the sliding member 32, respectively 33 by an arm 47, respectively 48, fixed to this member and having a trunnion 49, respectively 50, which passes through the corresponding hollow rod 40, respectively 41. The electro-magnet 36 has two windings 51 and 52 wound on a bobbin 53 made of insulating material. This bobbin is suspended in the cover 31 by disks 54 having central holes through which the corresponding rod 40 passes freely and, on their outer faces, centering surfaces by means of which the bobbin 53 and the disks 54 are centered with respect to guiding bearings provided in the cover 31 for the rod 40. The disks 54 are each provided on their inner face with a cylindrical flange supporting the bobbin 53. They are made of ferro-magnetic material and also serve to improve the magnetic circuit of the electro-magnet. This magnetic circuit comprises the core 38, the rod 40, an air-gap separating this rod 40 from the disk 54, and this disk itself, the cylindrical flange of which surrounds the end of the core 38 at a small distance. When an electric current is flowing in one of the windings 50 or 51, the core 38 is attracted inside the cylindrical flange of the adjacent disk 54, thus tending to reduce the reluctance of the magnetic circuit. It may be noted in this connection, that the cover 31 and its bosses are generally made of non-magnetic material, such as cast aluminium or an alloy of aluminium and magnesium. The electro-magnet 37 is constructed in the same way as the electro-magnet 36 and also comprises disks 55, each of which has a centering projection on its outer face and a cylindrical flange on its inner face. This electro-magnet also has two windings 56 and 57, wound on a bobbin 58 of insulating material.

When one of the cores 38 is displaced under the action of an electric current flowing through one of the associated windings 51 and 52, respectively 56 and 57, it moves the associated sliding member 32, respectively 33 by reason of its mechanical connection with this member by means of the hollow rod 40, respectively 41, the trunnion 49, respectively 50 and the arm 47, respectively 48. In its turn, the sliding member moves the associated sliding gears by means of the fork 34, respectively 35 and causes them to engage with the chosen gear wheel.

Figure 7:
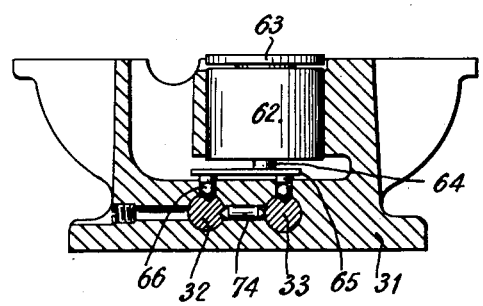
Fig. 7 is a sectional elevation along 7—7 in Fig. 5.

A locking electro-magnet 59, which can be seen in Fig. 4 and in Fig. 7, is arranged at one end of the device. This electro-magnet has a core 60, and a winding 61 and an outer screen 62 made of magnetic material. The core 60 bears a plate 63, also made of magnetic material and the diameter of which is equal to that of the magnetic screen 62. It is arranged to slide inside the winding and has a cylindrical projecting part 64 of small diameter, which passes freely through the lower end of the screen 62. When electric current flows through the winding 60, the projecting part 64 is pressed against a plate 65 which, in its turn, presses on two balls 66 (Figs. 4 and 7), so as to lock the two sliding members 32 and 34 in position. These balls are guided in holes bored in a boss of the cover 31 in which the members 32 and 33 are slideably mounted. The balls 66 engage in V-shaped notches of these sliding members. When the electro-magnet 59 is not energized, the balls 66 are free to move upwards, pushed back by one of the inclined flanks of one of the notches of one of the said members, which are thus free to slide and to bring the associated sliding gears into engagement with the chosen gear wheel. The magnetic screen 62 serves to improve the magnetic circuit of the electro-magnet 59. This magnetic circuit consists of this screen on the one hand and of the core 60 on the other. A slight air-gap subsists between the projecting part 64 of this core and a central hole in the bottom of the casing 62, and a variable air-gap separates the plate 63, secured to the core 60, from the upper edge of the screen 62. When electric current flows in the winding 61, the core is attracted downwards, its plate 63 coming nearer to the edge of the screen 62, thus reducing the reluctance of the magnetic circuit. It must be noted that the balls 66 are not pressed by springs, the weight of the plate 65, added to that of the core 60, being sufficient to maintain them in their respective holes. Owing to the favorable lay out of its magnetic circuit, and to the fact that there is no force acting against the magnetic attraction of the core 60, the electro-magnet 59 may be arranged so as to draw a very small amount of electric energy.

Figure 8:
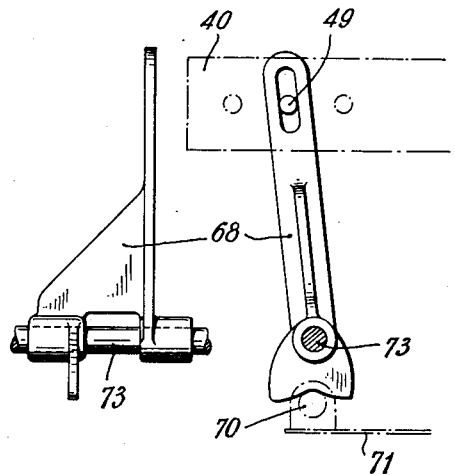
Fig. 8 and Fig. 9 are detail views showing actuating cams for the switch of the device.
Figure 9:
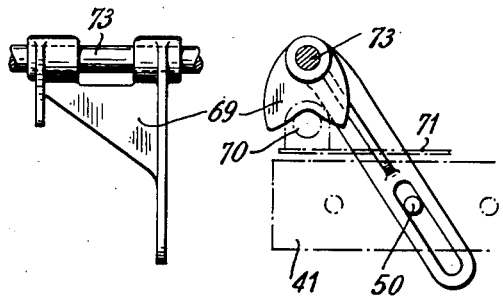

A switch 67, preferably of the sudden-interrupting type, serves to control the electro-magnet 59. This switch can particularly be seen on Fig. 5 and on Fig. 6. It is controlled by cams 68 (Fig. 8) and 69 (Fig. 9), respectively actuated by one of the hollow rods 40 and by one of the rods 41. These cams are arranged to bear on a roller 70 when brought into a position corresponding to one of the working positions of the associated sliding member. The roller 70 is secured to the end of a resilient arm 71, designed to press on a control-button 72 of the switch 67. The cams 68 and 69 respectively are rotatably mounted on a rod 73 secured to the cover of the gear-box. They each comprise an arm provided with a slot surrounding a projecting part of the end of the trunnion 49 or 50 of the arm 47, respectively 48 of the associated sliding member 32, respectively 33.

As may be seen in Fig. 7, a locking device is provided to prevent the two sliding members 32 and 33 from moving simultaneously. This device comprises a pin 74 lodged in the cover 31 and arranged between the sliding members 32 and 33. This pin is pointed at both ends. It can slide transversally between the sliding members 32 and 33 to engage notches of these members. The length of the pin 74 is such that, when one of the sliding members 32 or 33 is displaced, one of the inclined flanks of the notch of this member in which the point of the pin 74 was engaged pushes this pin back and presses it into the opposite notch of the other sliding member, so as to lock this other member in position.

Figure 10:
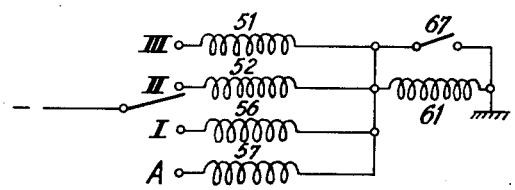
Fig. 10 is the electric diagram of this device.

The device operates in a very simple manner. A selector consisting of a switch with four positions, enables to select any one of the four working positions of the gear-changing mechanism (Fig. 10). When the movable contact of this switch is moved from one position to another, for instance from its position III, corresponding to the third speed, to its position II, corresponding to the second speed, the energizing circuit of the electro-magnet 51 of the locking electro-magnet 61 is interrupted, and the core 38 is brought back to its central position by the springs 42. The gear-changing mechanism is then in its dead position, and the clutch of a vehicle fitted with this mechanism must then be actuated. When the movable contact of the switch reaches the contact point II, the winding 52 of the electro-magnet 36 is energized, whilst the winding 61 of the locking electro-magnet 59 is not, this winding being short-circuited by the switch 67, which is then closed, no pressure being applied to the button 72. This winding 52 attracts the core 38, thus bringing the sliding member 32 to its position corresponding to the second speed. When this member reaches this position, the associated cam 68 presses on the roller 70 until the resilient arm 71 is brought into contact with the button 72 of the switch 67 and depresses it, thus opening the switch. The winding 61 of the locking electro-magnet is then immediately energized through the winding 52 of the actuating electro-magnet, with which it is connected in series. The pedal of the clutch may then be released, the gear-changing operation being completed.

The casing aand cover of the gear-box might also be made of magnetic material, such as cast iron; it would be sufficient to provide bushings of non-magnetic material to accommodate the hollow rods 40, respectively 41, which carry the cores 38. The disks 54 and 55, the plate 63 and the magnetic screen 62, as well as the cores 38, are preferably made of soft steel.

It may be noted that the arrangement of the switch 67 is extremely advantageous, because the interruption-spark, which tends to be produced when the current energizing one of the actuating electro-magnets is interrupted by this switch, is for a great part absorbed by the winding 61, connected in parallel with the switch 67.

The striker rod can be made of any magnetic or non-magnetic material, of metal or of plastic material for instance.

The described remote control device can be applied to any number of gear-ratios and of sliding gears.

The described locking mechanism could be replaced by any other known electric, mechanical, pneumatic or hydraulic device operating, as that of the described device, only after the striker rod has been brought to one of its working positions. The locking action may be controlled by the electro-magnet actuating the sliding gears. In that case, a mechanical control of the locking action may be obtained, which has the advantage of ensuring that the sliding gears which are in mesh and those which are in their dead positions are all correctly positioned. To this end, the control electro-magnet which has brought a sliding gear in engagement may be left energized, a resistance being connected in series with this electro-magnet when the desired position has been reached. The reduced current which then flows through the winding of this elecro-magnet is sufficient to provide a satisfactory locking action.

The second embodiment of the device is particularly simple and reliable and effective in operation.

These control devices are suitable for motor cars and also for all kinds of motor vehicles and of machine-tools comprising multiple-speed gear-boxes.

The gear-box control lever which, in the case of a motor car, obstructs the space between the two front seats, can be substituted by a simple electric switch capable of controlling the gear-box mechanism at a distance without employing a complicated gear-device, even when this mechanism is far off from the switch.

What I claim is:

1. An operating arrangement for a device e. g., a gear adapted to be moved into and out of operative position by a sliding member comprising, in combination, an operating member; means for slidably mounting said operating member between inoperative position and operative position; first electromagnet means associated with said slidable operating member for sliding the same from inoperative position into operative position; a first energizing electric circuit connected to said first electromagnet means for energizing the same for movement of said slidable operating member from inoperative into operative position; blocking means associated with said slidable operating member movable between inoperative position permitting free sliding of said slidable operating member and operative position engaging and blocking said slidable operating member so as to prevent sliding thereof; second electromagnet means associated with said blocking means for moving the same from an inoperative position into operative position; a second energizing electric circuit connected to said second electromagnet means for energizing the same for movement of said blocking means into operative position; and switch means actuated by said slidable operating member when the same reaches its operative position and, upon actuation, connecting said second energizing electric circuit so as to energize said second electromagnet means, moving said blocking means into operative position and thus holding said slidable operating member in its operative position.

2. An operating arrangement for a device e. g., a gear adapted to be moved into and out of operative position by a sliding member comprising, in combination, an operating member; means for slidably mounting said operating member between inoperative position and operative position; first electromagnet means associated with said slidable operating member for sliding the same from inoperative position into operative position; a first energizing electric circuit connected to said first electromagnet means for energizing the same for movement of said slidable operating member from inoperative into operative position; blocking means associated with said slidable operating member movable between inoperative position permitting free sliding of said slidable operating member and operative position engaging and blocking said slidable operating member so as to prevent sliding thereof; second electromagnet means associated with said blocking means for moving the same from an inoperative position into operative position; a second energizing electric circuit connected to said second electromagnet means for energizing the same for movement of said blocking means into operative position; and switch means actuated by said slidable operating member when the same reaches its operative position, and upon actuation, disconnecting said first energizing electric circuit so as to terminate further energization of said first electromagnet means and simultaneously connecting said second energizing electric circuit so as to energize said second electromagnet means, moving said blocking means into operative position and thus holding said slidable operating member in its operative position.

3. An operating arrangement for a device e. g., a gear adapted to be moved into and out of operative position by a sliding member comprising, in combination, an operating member; means for slidably mounting said operating member between inoperative position and operative position; first electromagnet means associated with said slidable operating member for sliding the same from inoperative position into operative position; a first energizing electric circuit connected to said first electromagnet means for energizing the same for movement of said slidable operating member from inoperative into operative position; blocking means associated with said slidable operating member movable between inoperative position permitting free sliding of said slidable operating member and operative position engaging and blocking said slidable operating member so as to prevent sliding thereof; second electromagnet means associated with said blocking means for moving the same from an inoperative position into operative position; a second energizing electric circuit connected to said second electromagnet means for energizing the same for movement of said blocking means into operative position; and a contact breaker switch connected in said second energizing electric circuit and parallel to said second electromagnet means, said contact breaker switch being actuated by said slidable operating member when the same reaches its operative position and, upon actuation, connecting said second electromagnet means in said second electric energizing circuit so as to energize said second electromagnet means, moving said blocking means into operative position and thus holding said slidable operating member in its operative position.

4. An operating arrangement for a device e. g., a gear adapted to be moved into and out of operative position by a sliding member comprising, in combination, an operating member; means for slidably mounting said operating member between inoperative position and operative position; first electromagnet means associated with said slidable operating member for sliding the same from inoperative position into operative position; a first energizing electric circuit connected to said first electromagnet means for energizing the same for movement of said slidable operating member from inoperative into operative position; blocking means associated with said slidable operating member movable between inoperative position permitting free sliding of said slidable operating member and operative position engaging and blocking said slidable operating member so as to prevent sliding thereof; second electromagnet means associated with said blocking means for moving the same from an inoperative position into operative position; a second energizing electric circuit connected to said second electromagnet means for energizing the same for movement of said blocking means into operative position; and a contact breaker switch connected in said second energizing electric circuit and parallel to said second electromagnet means, said contact breaker switch being actuated by said slidable operating member when the same reaches its operative position and, upon actuation, connecting said second electromagnet means in said second electric energizing circuit so as to energize said second electromagnet means, moving said blocking means into operative position and thus holding said slidable operating member in its operative position, said first and second electric circuits being connected in series with each other whereby the current flowing through said first electromagnet means is substantially reduced by the impedance of said second electromagnet means when said slidable operating member reaches the operative position thereof.

5. An operating arrangement for a device e. g., a gear adapted to be moved into and out of operative position by a sliding member comprising, in combination, an operating member; means for slidably mounting said operating member between inoperative position and operative position; first electromagnet means associated with said slidable operating member for sliding the same from inoperative position into operative position; a first energizing electric circuit connected to said first electromagnet means for energizing the same for movement of said slidable operating member from inoperative into operative position; blocking means associated with said slidable operating member movable between inoperative position permitting free sliding of said slidable operating member and operative position engaging and blocking said slidable operating member so as to prevent sliding thereof; second electromagnet means associated with said blocking means for moving the same from an inoperative position into operative position; a second energizing electric circuit connected to said second electromagnet means for energizing the same for movement of said blocking means into operative position; a contact breaker switch connected in said second energizing electric circuit and parallel to said second electromagnet means; and mechanical transmission means actuating said contact breaker switch when said slidable operating member reaches its operative position, said contact breaker switch, upon actuation, connecting said second electromagnet means in said second electric energizing circuit so as to energize said second electromagnet means, moving said blocking means into operative position and thus holding said slidable operating member in its operative position.

6. An operating arrangement for a device e. g., a gear adapted to be moved into and out of operative position by a sliding member comprising, in combination, an operating member; means for slidably mounting said operating member between inoperative position and operative position; first electromagnet means associated with said slidable operating member for sliding the same from inoperative position into operative position; a first energizing electric circuit connected to said first electromagnet means for energizing the same for movement of said slidable operating member from inoperative into operative position; blocking means associated with said slidable operating member movable between inoperative position permitting free sliding of said slidable operating member and operative position engaging and blocking said slidable operating member so as to prevent sliding thereof; second electromagnet means associated with said blocking means for moving the same from an inoperative position into operative position; a second energizing electric circuit connected to said second electromagnet means for energizing the same for movement of said blocking means into operative position; a contact breaker switch connected in said second energizing electric circuit and parallel to said second electromagnet means; and mechanical transmission means actuating said contact breaker switch when said slidable operating member reaches its operative position, said contact breaker switch, upon actuation, connecting said second electromagnet means in said second electric energizing circuit so as to energize said second electromagnet means, moving said blocking means into operative position and thus holding said slidable operating member in its operative position, said first and second electric circuits being connected in series with each other whereby the current flowing through said first electromagnet means is substantially reduced by the impedance of said second electromagnet means when said slidable operating member reaches the operative position thereof.

7. A multiple speed gear box comprising at least one sliding member having at least one working position and adapted for actuating sliding gears so as to bring the same selectively into engagement with at least one gear wheel, a separate actuating electromagnet for each working position of each sliding member, each of said electromagnets being adapted to actuate the associated sliding member for bringing it into a corresponding working position, a single latching electromagnet adapted to actuate at least one latching member movable transversally to an associated sliding member for latching the same in any selected working position, and at least one switch arranged to be actuated by at least one associated sliding member for interrupting at least a main energizing circuit for an actuating electromagnet associated with this sliding member when the same reaches the working position corresponding to this electromagnet and to cause latching of said sliding member in this working position by means of the latching electromagnet and of the latching member cooperating with said sliding member.

8. A multiple speed gear box comprising a plurality of sliding members having each at least one working position and each adapted for actuating sliding gears so as to bring the same selectively and one at a time into engagement with at least one gear wheel, a separate actuating electromagnet for each working position of each sliding member, each of said electromagnets being adapted to actuate the associated sliding member for bringing the same into a corresponding working position, a single latching electromagnet adapted to actuate a plurality of latching members, one for each sliding member and each movable transversally to the associated sliding member for latching the same in any selected working position, all the latching members being mechanically connected to the armature of the latching electromagnet, and at least one switch arranged to be actuated by at least one associated sliding member for interrupting at least a main energizing circuit for an actuating electromagnet associated with this sliding member when the same reaches the working position corresponding to this electromagnet and to cause latching of said sliding member in this working position by means of the latching electromagnet and of the latching member cooperating with said sliding member, whereby each sliding member is latched in each working position by said latching electromagnet.

9. A multiple speed gear box comprising at least one sliding member having at least one working position and adapted for actuating sliding gears so as to bring the same selectively into engagement with at least one gear wheel, a separate actuating electromagnet for each working position of each sliding member, each of said electromagnets being adapted to actuate the associated sliding member for bringing it into a corresponding working position, a single latching electromagnet adapted to actuate at least one latching member movable transversally to an associated sliding member for latching the same in any selected working position, and a contact-breaker switch connected across the coil of said latching electromagnet and arranged to be actuated by at least one associated sliding member for interrupting a main energizing circuit for an actuating electromagnet associated with this sliding member when the same reaches the working position corresponding to this electromagnet and to cause said latching electromagnet to be energized and to latch said sliding member in said working position by means of the latching member cooperating with said sliding member.

10. A multiple speed gear box comprising at least one sliding member having at least one working position and adapted for actuating sliding gears so as to bring the same selectively into engagement with at least one gear wheel, a separate actuating electromagnet for each working position of each sliding member, each of said electromagnets being adapted to actuate the associated sliding member for bringing it into a corresponding working position, a selector-switch adapted for selectively energizing any of said actuating electromagnets, a single latching electromagnet adapted to actuate at least one latching member movable transversally to an associated sliding member for latching the same in any selected working position, and a contact breaker switch connected across the coil of said latching electromagnet, in a main energizing circuit for the coils of all the actuating electromagnets, and arranged to be actuated by at least one associated sliding member for interrupting the main energizing circuit for any actuating electromagnet associated with this sliding member when the same reaches the working position corresponding to this electromagnet and to cause said latching electromagnet to be energized through the coil of this actuating electromagnet and to latch said sliding member in said working position by means of the latching member cooperating with said sliding member, whereby the current flowing through the coil of any actuating electromagnet is substantially reduced by the impedance of the coil of the latching electromagnet connected in series therewith when the sliding member associated with said actuating electromagnet reaches the working position corresponding to this electromagnet.

11. A multiple speed gear box comprising a plurality of sliding members having each at least one working position and each adapted for actuating sliding gears so as to bring the same selectively and one at a time into engagement with at least one gear wheel, a separate actuating electromagnet for each working position of each sliding member, each of said electromagnets being adapted to actuate the associated sliding member for bringing the same into a corresponding working position, a selector-switch adapted for selectively energizing any of said actuating electromagnets, mechanical interlocking means adapted to prevent more than one sliding member being in a working position at the same time, a single latching electromagnet adapted to actuate at least one latching member movable transversally to the sliding members for latching the same in any selected working position, a single contact breaker switch connected across the coil of said latching electromagnet, in a main energizing circuit for the coils of all the actuating electromagnets, and mechanical transmission means arranged to actuate said contact breaker switch from any of the sliding members for interrupting the main energizing circuit for any actuating electromagnet when the sliding member associated with this electromagnet reaches the working position corresponding to this actuating electromagnet and to cause said latching electromagnet to be energized through the coil of this actuating electromagnet and to latch said sliding member in said working position by means of the latching member cooperating with said sliding member, whereby the current flowing through the coil of any actuating electromagnet is substantially reduced by the impedance of the coil of the latching electromagnet connected in series therewith when the sliding member associated with said actuating electromagnet reaches the working position corresponding to this electromagnet.

FRANÇOIS D'OZOUVILLE.

References Cited in the file of this patent

UNITED STATES PATENTS

| Number | Name | Date |
|---|---|---|
| 925,270 | Beemer | June 15, 1909 |
| 1,252,241 | Ter Cock | Jan. 1, 1918 |
| 1,279,767 | Schoenbein | Sept. 24, 1918 |
| 1,287,801 | Underhill | Dec. 17, 1918 |
| 1,360,035 | Shepherd | Nov. 23, 1920 |
| 1,373,099 | Ross | Mar. 29, 1921 |
| 1,564,815 | Ballance | Dec. 8, 1925 |
| 1,880,859 | Davis | Oct. 4, 1932 |
| 1,990,352 | Singleton | Feb. 5, 1935 |
| 2,045,500 | Thurber | June 23, 1936 |
| 2,141,096 | Thurber | Dec. 20, 1938 |
| 2,201,118 | Beede | May 14, 1940 |
| 2,425,734 | Gille et al. | Aug. 19, 1947 |
| 2,438,691 | Armantrout | Mar. 30, 1948 |
| 2,496,178 | Schleicher | Jan. 31, 1950 |